United States Patent [19]

Hendel et al.

[11] Patent Number: 5,175,732
[45] Date of Patent: Dec. 29, 1992

[54] METHOD AND APPARATUS FOR CONTROLLING DATA COMMUNICATION OPERATIONS WITHIN STATIONS OF A LOCAL-AREA NETWORK

[75] Inventors: Ariel Hendel, Ronkonkoma; John D. Virzi, Bronx, both of N.Y.

[73] Assignee: Standard Microsystems Corp., Hauppauge, N.Y.

[21] Appl. No.: 656,784

[22] Filed: Feb. 15, 1991

[51] Int. Cl.$^5$ .......................................... H04L 12/56
[52] U.S. Cl. ..................................... 370/94.1; 370/60
[58] Field of Search ................... 370/94.1, 85.2, 85.1, 370/67, 60, 61; 364/200

[56] References Cited

U.S. PATENT DOCUMENTS

| | | |
|---|---|---|
| 4,516,201 | 10/1985 | Warren et al. |
| 4,567,595 | 1/1986 | Hedlund ............... 370/13 |
| 4,577,314 | 3/1986 | Chu ....................... 370/60 |
| 4,593,281 | 6/1986 | Lare ..................... 370/85.2 |
| 4,597,074 | 6/1986 | Demichelis ........... 370/67 |
| 4,630,261 | 7/1986 | Irvin . |
| 4,641,307 | 2/1986 | Russell . |
| 4,704,717 | 7/1986 | King, Jr. . |
| 4,808,155 | 4/1987 | Costes et al. . |
| 4,855,904 | 9/1988 | Daberkow et al. . |

OTHER PUBLICATIONS

Preliminary Specification Pamphlet for the Intel 82592 Advanced CSMA/CD LAN Controller with 16-Bit Data Path, published by Intel Corporation, circa. 1988.

*Primary Examiner*—Douglas W. Olms
*Assistant Examiner*—T. Samuel
*Attorney, Agent, or Firm*—Hopgood, Calimafde, Kalil, Blaustein & Judlowe

[57] ABSTRACT

Method and apparatus are provided for data communication control within the communication controllers of stations within a local area network. In general, the method and apparatus involves maintaining within the command and status control interface unit of the communication controller, receive and transmit command queues as well as receive and transmit status queues. Pluralities of receive and transmit data packet storage locations are provided for storing data packets to be received as well as transmitted. Each receive command is uniquely associated with a data packet storage location. Receive and transmit commands are buffered in a pipeline manner in the receive and transmit command queues, respectively, whereas receive and transmit status bits are buffered in a pipeline manner in the receive and transmit status queues, respectively. The processor interfacing with the communication controller buffers transmit and receive commands in their respective queues and allocates corresponding data packet storage locations for these commands. The media access control unit of the communication controller executes each command when it is ready according to network protocol, and generates status bits which are buffered in respective status bit queues. The status bits are selectively processed to generate interrupts to the host processor, which can be serviced in due course. As a result of the present invention, consecutive transmission and reception of data packets can be achieved in a manner independent of the operation of the host processor. Consequently, the minimum back-to-back separation between two communication events of the same type, is eliminated thereby improving node and network data throughout.

47 Claims, 5 Drawing Sheets

METHOD AND APPARATUS FOR CONTROLLING DATA COMMUNICATION OPERATIONS WITHIN STATIONS OF A LOCAL-AREA NETWORK

BACKGROUND OF THE INVENTION

1. Field of Invention

The present invention generally concerns a method and apparatus for controlling data communication operations within stations of a local-area network (LAN), and more particularly to such a method and apparatus which enables the communication controller of each station to transfer data over the network communication medium, in a manner less sensitive to the interrupt latency of the processors of such stations.

2. Brief Description of the Prior Art

Local-area networks are communication systems for enabling data-processing devices, such as computer workstations, to communicate with each other through a communication (e.g. transmission) media. Data-processing devices in such networks are typically referred to as nodes or stations, and many such stations are likely to be relatively autonomous, requiring communication with other stations only occasionally. Other stations may require more frequent communication, and the amount of communication required by a particular station can vary from time to time.

In many local area networks, stations can be easily added to, removed from, and moved from place to place within the network. While there are numerous local area networks presently known, they can be classified into two general types. The first type of network is referred to as a "centralized network" which is characterized by the requirement of a centralized network controller which implements the network protocol. The second type of local area network is referred to as a "distributed network" which does not require a centralized network controller, and instead provides each station within the network with a communication controller having a medium access control (MAC) unit that locally implements the network protocol within each communication controller.

In a distributed local area network, packet switching is a technique commonly employed to dynamically allocate the communication resources of the network among multiple communicating stations. According to this technique, messages to be communicated between stations are partitioned (by the transmitting station's processor) into packets, having a fixed maximum size. The packets are then ascribed a station (i.e. source) identifier. The packets are then placed on the communication medium by the station's communication controller. Such packets are then sensed and selectively processed by the communication controller of the destination station in the network.

Any packet from one station to another station contains various fields of information specified in accordance with a predetermined network protocol. The information typically includes the identity of the source station, the identity of the destination station, and various other information concerning the characteristics of the packet. In some network protocols, a number of different types of packets may appear on the communication medium in accordance with the network protocol. Typically, these packets relate to either communication control or data-transfer functions.

To more fully appreciate the problems associated with conventional communication controllers used in the stations of distributed local-area-networks, reference is made to FIGS. 1 through 4.

Figure 1:
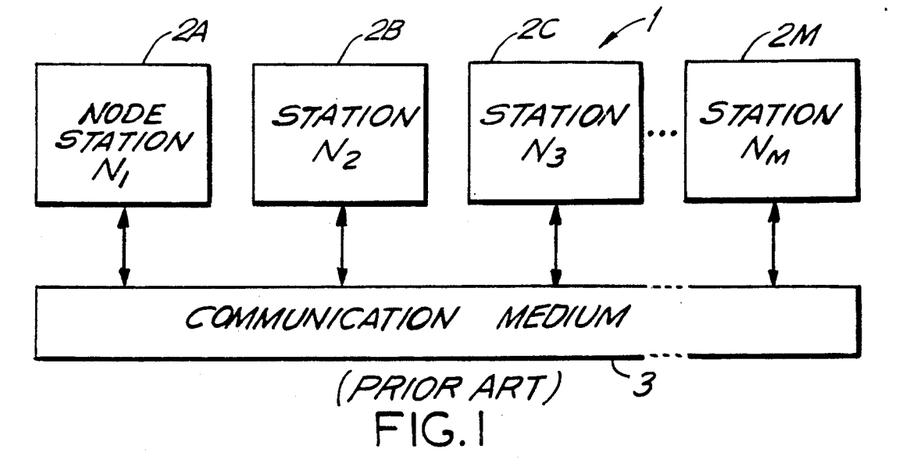
FIG. 1 is a schematic representation of a local area network system permitting a plurality of stations to access to a shared communication medium allocated in accordance with a network protocol.
Figure 2:
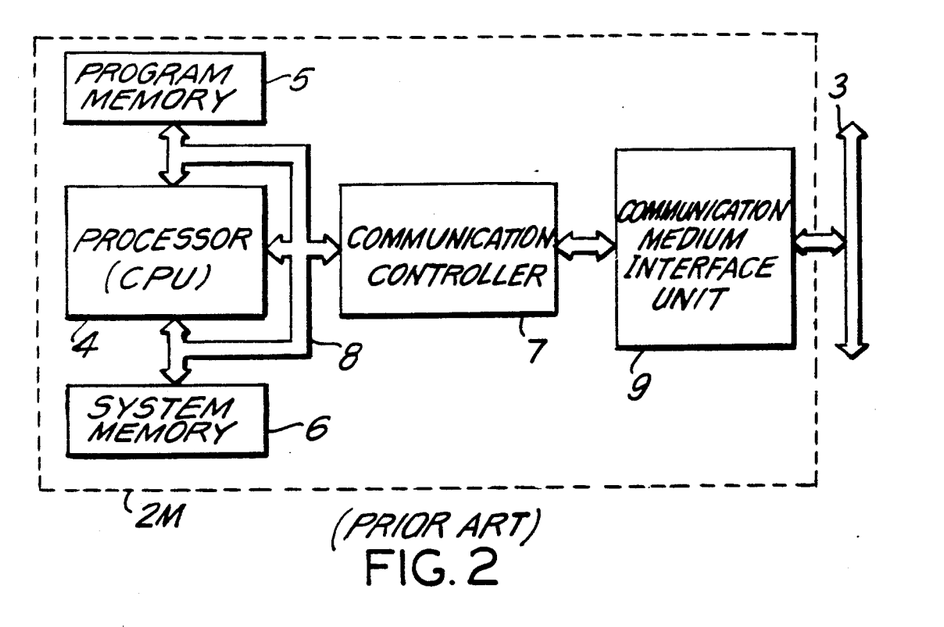
FIG. 2 is a block functional diagram of a prior art station within the local area network of FIG. 1, showing the major components of the station.

In FIG. 1, a distributed local area-network 1 is shown, comprising a plurality of stations (i.e. nodes 2A through 2M) which are operably associated to a communication medium 3, such as a cable. In FIG. 2, each station is shown to generally comprise a processor (e.g., CPU) 4, a program memory 5, a system memory 6, a communication controller 7, a system bus 8, and a communication medium interface unit 9. Processor 4, program memory 5 and system memory 6 are each associated with a system bus 8, and the system bus, in turn, is interfaced with communication controller 7, as shown. Communication controller 7 is interfaced with the communication medium by way of communication medium interface unit 9. Typically, communication medium interface unit 9 is suitably adapted for the particular characteristics of the communication medium being employed in the network.

Figure 3:
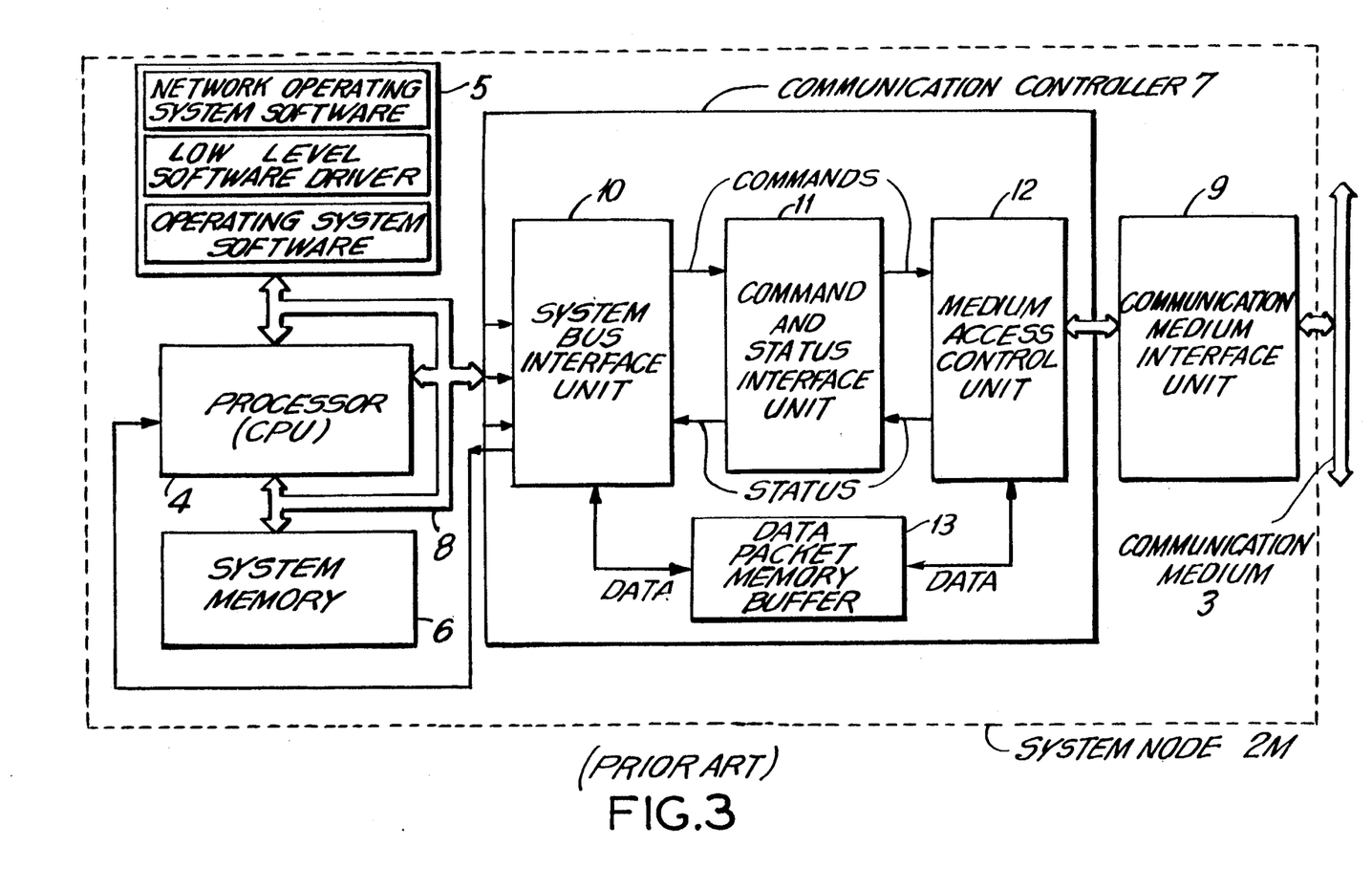
FIG. 3 is a block functional diagram of the prior art station illustrated in FIG. 2, showing functional subunits of each major component of the station.
Figure 4:
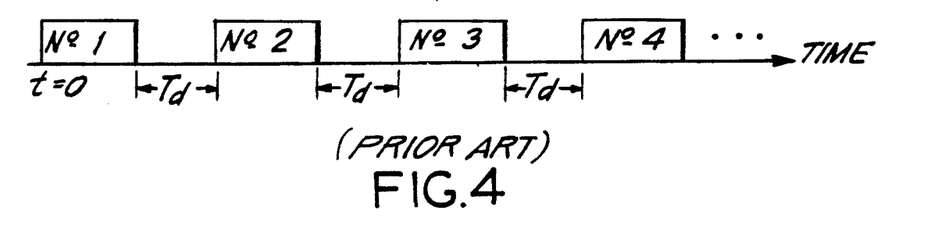
FIG. 4 is a schematic representation of data packet throughput over a network employing prior art data communication control techniques.

In FIG. 3, the subcomponents of a conventional communication controller 7 are shown to generally comprise a system bus interface unit 10, a command and status interface unit 11, a medium access control unit 12, and a data packet memory buffer 13. The system bus interface unit 10 interfaces system bus 8 with the command and status interface unit 11 and data packet memory buffer 13 of the communication controller. Command and status interface unit 11 interfaces system bus interface unit 10 with medium access control unit 12, as shown. Medium access control unit 12 interfaces the data packet memory buffer 13 with communication medium interface unit 9, and thus the communication medium 3, as shown.

Medium access control unit 12 comprises a microsequencer running a microprogram (i.e., an algorithm) which effectuates the network protocol and ultimately, the communication controller's access to the communication medium. To successfully carry out the network protocol, the medium access control unit in each station is communication controller must perform the same algorithm. To effectuate data transmission and data reception through the network, the network operating program of each station is operably associated with a software based low-level driver which maintains data transmit and data receive queues within the station's system memory. Processor "interrupts" provided by the communication controller are the basic scheduling events upon which the low-level driver manages the transmit and receive queues to and from the communication controller.

An important requirement of the low-level driver of each station's network operating program is that it is matched to the command and status interface unit and the memory structure of the data packet buffer. To effect data communication between two stations in the network, several critical operations must occur between the processor (CPU) and the communication controller of the transmitting station prior to putting a data packet onto the communication medium. In particular, during the transmit mode, the low-level driver must issue a transmit command to the command and status interface unit after a data packet is transferred from system memory to an assigned location in the data packet memory buffer. Also, during the receive mode, the low-level driver must issue a receive command to the command and status interface unit before a data packet is transferred from the data packet memory buffer to an assigned location in the system memory. The nature of prior art communication controllers, is such, however, that it can only work on one command of each type (i.e. transmit vs. receive) at any given time.

Communication of data packets between two stations in such distributed networks is governed by the microprogram running each station's communication controller and the network protocol. In the case of a token-passing network using, for example, the Arcnet ® local area network protocol, each station is periodically given an opportunity to transmit data packets to a desired destination station within the network. Whether transmitting or receiving data packets, each communication controller will indicate to its processor the completion of each command by issuing an "interrupt" to its central processors, which are acted upon by the low-level driver of the processor's network operating system.

Prior art data communication control employed in such distributed networks has not been without serious shortcomings and drawbacks, however.

In particular, the main limitation of such communication control schemes has been that there is a dead time from when the communication controller completes a command, until the station processor services the corresponding interrupt generated by the communication controller. For example, if the communication controller has just completed reception of a data packet, the communication controller cannot receive another data packet until the processor services the corresponding interrupt generated by the communication controller. Also, if the communication controller has just completed transmission of a data packet, then, even though the communication controller has received an invitation to transmit from a receiving station, the communication controller is not capable of commencing a subsequent transmission until its station's processor services the corresponding interrupt generated by the communication controller. During such dead time, illustrated in FIG. 4 as $T_d$, the communication controller cannot utilize the network for the same type of operation as the one just completed. This limitation of prior art data communication control results in a reduction in network throughput. In some scenarios, this limitation can translate into potentially undelivered data packets.

Thus, there is a great need in the art to provide a data communication control technique which can improve node and network data throughput, and make each communication controller less sensitive to processor interrupt response time, while avoiding the shortcomings and drawbacks of prior art data communication control techniques for distributed local area networks.

Accordingly, it is a primary object of the present invention to provide a method and apparatus for data communication control which allows consecutive transmissions and receptions of data packets to occur without host processor intervention.

It is another object of the present invention to provide such a method and apparatus for managing a page-oriented communication controller, so as to eliminate the minimum back-to-back separation between two communication events of the same type.

It is a further object of the present invention to provide such a method and apparatus in which transmit and receive commands and transmit and receive status interrupt bits are pipelined within a queue of selected depth.

A further object of the present invention is to provide such apparatus in the form of a communication controller for a local area network, in which four outstanding commands (two transmit and two receive commands) as well as their respective status interrupt bits can be buffered, and whenever the communication controller completes execution of one particular command, the communication controller immediately accesses the next command without the occurrence of a dead time between these events.

An even further object of the present invention is to provide such a communication controller allowing a simple double-buffering memory structure for data packets, while requiring minimal changes to existing low-level software drivers.

These and other objects will become apparent hereinafter and in the claims.

SUMMARY OF INVENTION

According to one of the broader aspects of the present invention, a command and status interface circuit is provided for use with a communication controller.

As envisioned in one embodiment, the communication controller comprises a bus interface unit, a data packet buffering means and a medium access control unit. The bus interface unit interfaces with the command and status interface circuit and with a system bus over which data packets and transmit and receive commands can be transmitted through the bus interface unit, and to the data packet buffering means and the command and status interface unit, respectively. The data packet buffering means has a plurality of data packet storage locations, each of which can be used for storing a data packet to be transmitted over or received from a communication medium. The medium access control unit is capable of performing transmit and receive commands, and interfaces with the command and status interface circuit and with the communication medium.

In general, the command and status interface circuit of the present invention comprises a command buffering means and a status buffering means which are each operatively associatable with the processor and the medium access control unit so as to allow consecutive transmission and reception of data packets in a manner which is independent of the operation of the processor.

In a preferred embodiment, the command buffering means includes a first storage unit and a second storage unit. The first storage unit has a plurality of receive command storage locations, into each of which a receive command uniquely associated with a data storage location can be written in by the processor, and selectively read out therefrom by the medium access control unit. Similarly, the second storage unit has a plurality of transmit command storage locations, into each of which a transmit command uniquely associated with a data packet storage location can be written by the processor, and selectively read out therefrom by the medium access control unit. The status buffering means includes a third storage unit and a fourth storage unit. The third storage unit has a plurality of receive status storage locations, into each of which a set of receive status bits can be written by the medium access control unit, and selectively read out therefrom by the processor. The fourth storage unit has a plurality of transmit status storage locations, into each of which a set of transmit status bits can be written by the medium access control unit and selectively read out therefrom by the processor.

In a preferred embodiment, each storage unit is First-In-First-Out (FIFO) storage unit which is provided with a particular set of information storage and accessing capacities, described below as follows. First FIFO storage unit permits the processor to write a receive command from the processor into the first FIFO storage unit upon the occurrence of a first prespecified processor event, and also permits the medium access control unit to read one receive command out of the first FIFO storage unit and into the medium access control unit upon the occurrence of a first prespecified event within the medium access control unit. The second FIFO storage unit permits the processor to write one transmit command from the processor into the second FIFO storage unit upon the occurrence of a second prespecified processor event, and further permits the medium access control unit to read one transmit command from said second FIFO storage unit into the medium access storage unit upon the occurrence of a second prespecified event within the medium access control unit. The third FIFO storage unit permits the medium access control unit to write one set of receive status bits from the medium access control unit into the third FIFO storage unit, and further permits the processor to read out one set of receive status bits from the third FIFO storage unit and transfer the set of receive status bits to the system bus interface unit. In turn, these receive status bits are selectively processed in order to generate interrupts to the processor. The fourth FIFO storage unit permits the medium access control unit to write one set of transmit status bits from the medium access control unit into the fourth FIFO storage unit, and further permits the processor to read out one set of transmit status bits from the fourth FIFO storage unit and transfer the set of transmit status bits to the system bus interface unit. The system bus interface unit selectively processes these transmit status bits in order to generate interrupts to the processor.

In a preferred embodiment, the command and status interface unit further comprises command routing means for selectively routing the receive commands to the first FIFO storage unit, the transmit commands to the second FIFO storage unit, miscellaneous commands to the medium access control unit, and clearing commands to the third and fourth FIFO storage units.

According to another aspect of the present invention, a communication controller for a local area network is provided. The communication controller includes the status and control interface circuit of the present invention, in addition to various supporting components discussed above.

According to yet another aspect of the present invention, a method is provided for buffering receive and transmit commands and status bits within a command and status interface unit of the communication controller.

In general, the method involves maintaining in the command and status interface unit, a receive command queue having a plurality of receive command storage locations. These receive command storage locations includes a first insert storage location at which each receive command can be inserted into the receive command queue, and a first removal storage location from which each receive command can be removed from the receive command queue. In the command and status interface unit, a transmit command queue is maintained having a second plurality of transmit command storage locations. These transmit command storage locations includes a second insert storage location at which each transmit command can be inserted in the transmit command queue, and a second removal storage location from which each transmit command can be removed from the transmit command queue. Each transmit command storage location is capable of storing a transmit command. A first plurality of receive data packet storage locations is provided for storing a plurality of data packets to be received. Each receive data packet storage location is uniquely assignable to one receive command being stored in the receive command queue. A second plurality of transmit data packet storage locations is also provided for storing a plurality of data packets to be transmitted. Each transmit data packet storage location is uniquely assignable to one transmit command being stored in the transmit command queue.

In the command and status interface unit, the method further involves maintaining a receive status queue having a plurality of receive status bit storage locations. These receive status bit storage locations include a third insert storage location at which each set of receive status bits can be inserted into the receive status queue, and a third removal storage location from which each set of receive status bits can be removed from the receive status queue. Each receive status bit storage location is uniquely associated with one receive command. In the command and status interface unit, a transmit status queue is provided having a plurality of transmit status bit storage locations. These transmit status bit storage locations include a fourth insert storage location at which each set of transmit status bits can be inserted into the transmit status queue, and a fourth removal storage location at which each set of transmit status bits can be removed from the transmit status queue. Each transmit status bit is uniquely associated with one transmit command.

According to the method of the present invention, receive and transmit commands are buffered in a pipeline manner in the receive and transmit command queues, respectively, whereas receive and transmit status bits are buffered in a pipeline manner in the receive and transmit status queues, respectively. The processor interfacing with the communication controller stores transmit and receive commands in their respective queues and allocates corresponding data packet storage locations for these commands within the communication controller. The media access control unit of the communication controller executes each command when it is ready according to network protocol, and generates corresponding status bits which are subsequently buffered in respective status bit queues. These status bits are then selectively processed to generate interrupts to the host processor. These interrupts can be serviced by the processor's low-level driver in due course without effecting or otherwise delaying consecutive data communication control operations executed by the media access control unit.

As a result of the present invention, it is now possible to consecutively transmit and receive virtually any number of data packets without the necessity of waiting for the host processor to service interrupts provided thereto during data communication operations by the communication controller.

BRIEF DESCRIPTION OF THE DRAWINGS

For a more complete understanding of the objects of the present invention, the detailed description of the illustrated embodiments is to be taken in connection with the following drawings, in which.

DETAILED DESCRIPTION OF THE ILLUSTRATED EMBODIMENT

Figure 5:
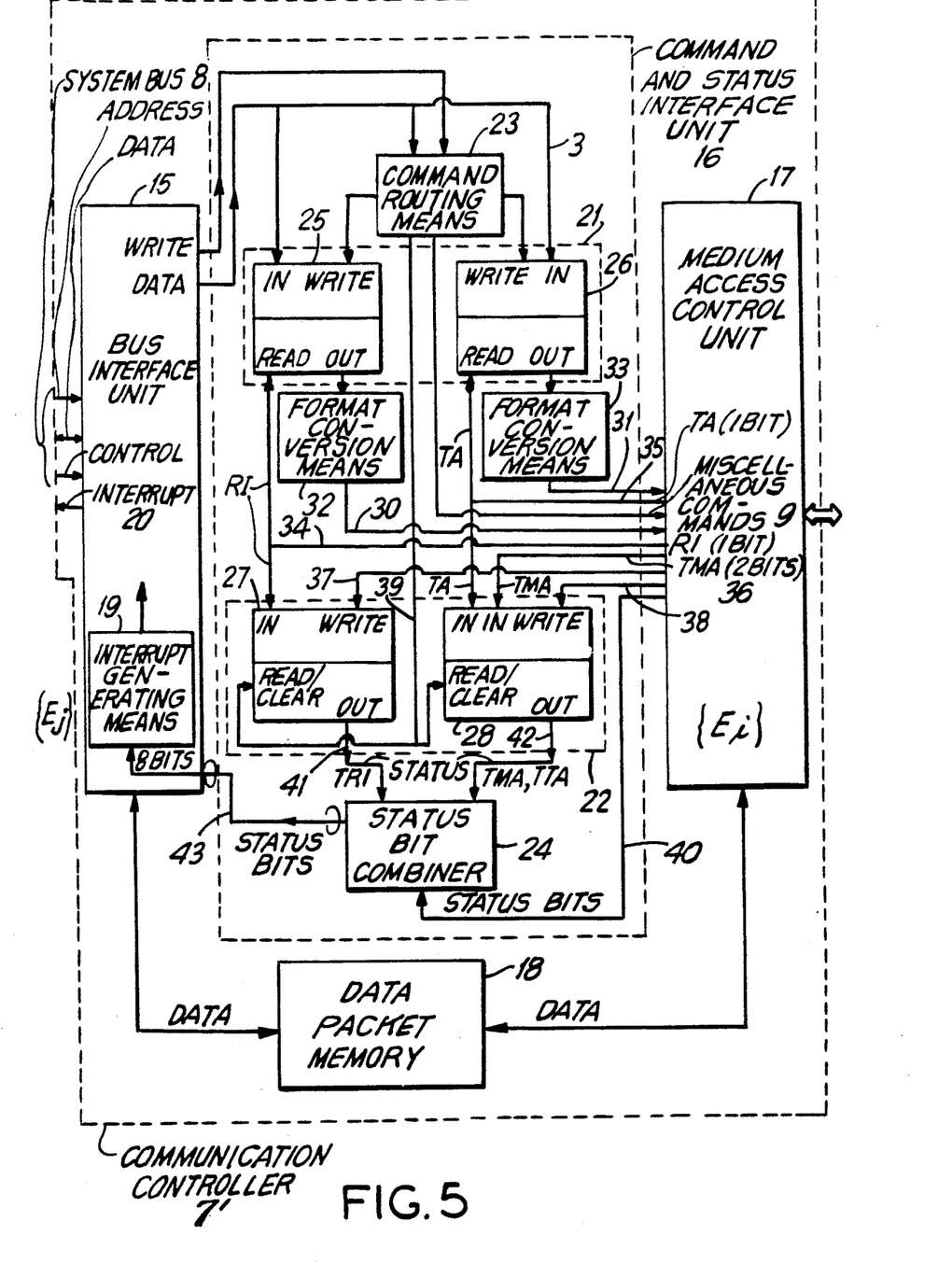
FIG. 5 is a block functional diagram of one embodiment of a communication controller constructed in accordance with the principles of the present invention.

Referring to FIG. 5, an illustrated embodiment of the communication controller of the present invention is shown. In general, a communication controller 7' comprises a bus interface unit 15, a command and status interface unit 16, a medium access control unit 17, and a data packet memory buffer 18. Preferably, all of these components would be implemented as digital circuits integrated on a single chip using known IC manufacturing techniques.

As hereinbefore described, bus interface unit 15, data packet memory buffer 18, and medium access control unit 17 are conventional and well known in the art. In the illustrated embodiment, Arcnet ® network protocol has been selected for medium access control unit 17, and a page-oriented memory organization for data packet memory buffer 18. Bus interface unit 15 can be adapted for interfacing with an IBM ® PC AT, bus 8, or any other suitable system bus known in the art.

System bus interface unit 15 typically includes logical circuitry for interfacing the address, data and command lines of system bus 8 with command and status interface unit 16 and memory buffer 18. System bus interface unit 15 also includes a conventional interrupt generating means 19, which in the illustrated embodiment, receives a set of receive and transmit status bits from command and status interface unit 16. Interrupt generating means 19 selectively processes such status bits and generates an interrupt signal to the processor when certain status bits become true (i.e. attain conventional logic "1" level). Such a functional subunit can be realized by an interrupt mask register well known in the art. As shown in FIG. 5, interrupt signals are provided to the station (i.e. host) processor 4 by way of a designated interrupt line 20. When the low-level driver executed by the host processor receives the interrupt, it will instruct the processor to read out the status bits from the command and status interface unit, in a manner which will be described in greater detail hereinafter.

Preferably, data packet memory buffer 18 comprises a dual-port, randomly-accessible memory (RAM) storage device which has a plurality of data storage locations. Memory buffer 18 is organized such that each addressable storage location (i.e. page) has a storage capacity sufficient for storing a data packet either transmitted from the station's system memory 6 by the processor, or received from a transmitting station by the medium access control unit. Preferably, at least four pages of memory storage are provided for by the data packet memory buffer, so that, at times, at least two pages of memory can be assigned to data packets to be received, and at least two pages of memory assigned to data packets to be transmitted. In this way, a data packet receiving queue and a data packet transmitting queue can be simultaneously managed within data packet memory buffer 18.

Figure 6:
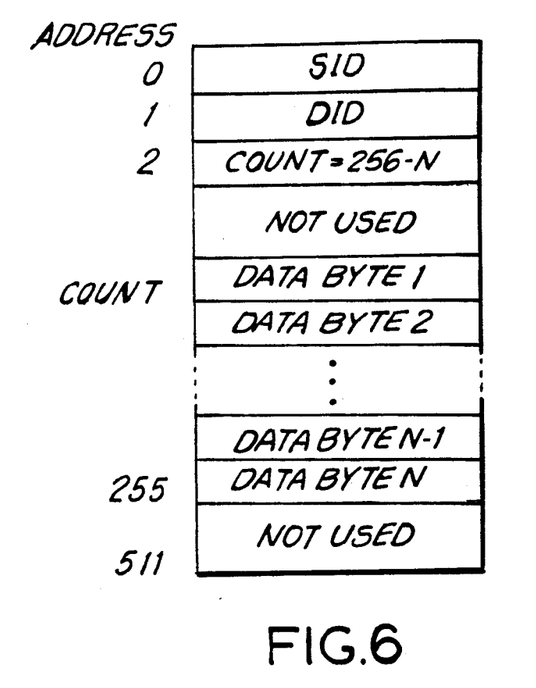
FIG. 6 is a schematic representation of the data packet format for each data packet buffered in an assigned page of memory within the data packet memory of the communication controller of the illustrated embodiment.

In FIG. 6, a preferred format is shown for each page storage location in data packet memory buffer 18. Address location 0 of each memory page contains the source identifier (SID) bits which identify the source of each data packet. As illustrated, address location 1 contains the destination identifier (DID) bits which identify the destination of each data packet. Address location 2 contains the count bits, which for short packets, for example, would have the value 256−N, where N represents the message length of each data packet.

Referring again to FIG. 5, medium access control unit 17 reads transmit, receive and other miscellaneous commands from command and status interface unit 16 of the present invention. As in prior art applications, medium access control unit 17 reads either a transmit or receive command from command and status interface unit 16, and then either reads out from or writes into memory buffer 18, a data packet uniquely assigned to the acquired command. After execution of the data communication operation, medium access control unit 17 writes various status bits into the command and status interface 16 to reflect completion of the operation. In turn, these transmit and/or receive status bits are provided to system bus interface unit 15, in which the status bits are continually presented to the processor, and are selectively processed by interrupt generating subunit 18 to produce an interrupt to the station's processor. Based on the interrupts to the processor, the interrupt driven low-level driver controls the processor to read the status bits from the system bus interface unit 8. The read status bits are then used by the low-level driver to orchestrate events at higher levels of the network operating system.

As hereinbefore described, medium access control unit 17 includes an internal microsequencer running a microprogram which performs all of the control operations necessary to carry out the Arcnet ® protocol. The microsequencer in general comprises a read-only memory for storing the microprogram, a program counter, two instruction registers, an instruction decoder, a no-op generator, and jump logic and network reconfiguration logic, which are configured together in a manner well known in the art.

To fully appreciate the control operations of medium access control unit 17 and, more particularly when it reads commands from and writes status bits into the command and status interface unit 16, an understanding of the Arcnet ® protocol is in order. In the Arcnet ® protocol, five types of "packets" may be placed on or otherwise transmitted over the network communication cable 3. The format of these packets is briefly described below.

The first type of packet is the Invitation to Transmit (ITT) packet which is used to pass the "token" from one station to another station according to a network configuration order determined during a network configuration operation well known in the art. In the Arcnet ® protocol, the ITT packet is sent by transmitting, in sequence, an Alert Burst consisting of 6 unit intervals of logic "1"'s, End of Transmission (EOT) bits consisting of ASCII Code 04 HEX, followed by two repeated Destination Identification (DID) characters.

The second type of packet is the Free Buffer Enquiry (FBE) packet which is used to ask another station in the network if it is ready to accept a packet of data. The FBE packet is sent by transmitting, in sequence, an Alert Burst, Enquiry (ENQ) bits consisting of an ASCII Code 85 HEX, followed by two repeated DID characters.

Figure 7:
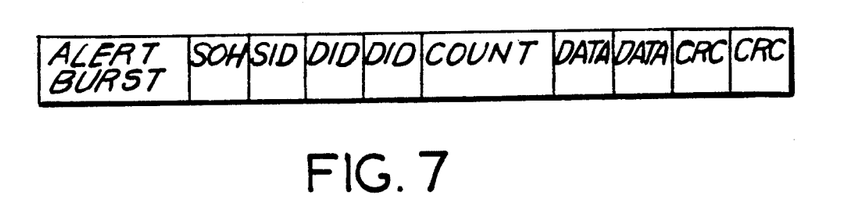
FIG. 7 is a schematic representation of a data packet assembled in accordance with the field format of the illustrated embodiment.

The third type of packet is the data packet which consists of the actual data being transmitted from one station to another. As illustrated in FIG. 7, a data packet is sent by transmitting, in sequence, an Alert Burst, Start of Header (SOH) bits consisting of ASCII code 01 HEX, two repeated DID characters, a Count field (i.e. count=256−N for short packets), a variable length data field, followed by two cyclical redundancy check (CRC) characters.

The fourth type of packet is the Acknowledgment (ACK) which is used to acknowledge reception of a packet, or as an affirmative response to Free Buffer Enquiries. The ACK packet is sent by transmitting in sequence, an Alert Burst followed by an Acknowledgment (ACK) character consisting of ASCII Code 86 HEX.

The fifth type of packet is the Negative Acknowledgment (NAK) packet which is used as a negative response to FBE packets. The NAK packet is sent by transmitting, in sequence, an Alert Burst, followed by a Negative Acknowledgement (NAK) character consisting of ASCII Code 15 HEX.

Referring now to FIG. 5, the command and status interface unit 16 in accordance with the present invention, generally comprises a command buffering unit 21, a status buffering means 22, a command routing unit 23, and a status bit combining unit 24. In the preferred embodiment, command buffering unit 21 is realized by first and second first-in-first-out (FIFO) storage units 25 and 26 for temporary storage of receive and transmit commands, respectively. Each FIFO storage unit 25 and 26 has a plurality of command storage location, which in the illustrated embodiment, is of depth 2. Notably, however, in other embodiments the depth of these units can be greater than two. In one illustrated embodiment, the length of each storage location is of bit length seven. As shown in FIG. 5, data lines from system bus 8 extend through bus interface unit 15, and connect to the data input of FIFO storage units 25 and 26. Also, address and control lines from the system bus extend through bus interface unit 15, into command routing unit 23, and connect to the write inputs of FIFO storage units 25 and 26. As seen by the processor, the storage locations in each FIFO storage unit 25 and 26 reside logically at the same address in the command buffering unit 21.

In general, the plurality of receive storage command locations of FIFO storage unit 25 includes a first insert storage location into which each receive command can be written, and a first removal storage location from which each receive command can be read out. In practice, the insert and removal locations are indicated by the pointers of the addressing system used in implementing FIFO storage device 25. The first insert storage location is advanced by the processor writing a receive command into FIFO storage unit 25. On the other hand, the first removal storage location is advanced by the medium access control unit reading a receive command from FIFO storage unit 25. Constructed as such, a receive command uniquely associated with a data packet in a specific storage location (i.e. page) of memory buffer 18, can be written into the insert storage location of FIFO storage unit 25 by the processor. Also the receive command stored in the removal storage location can be selectively read out therefrom by medium access control unit 17.

Similarly, the plurality or receive storage locations of FIFO storage unit 26 includes a second insert storage location, into which each transmit command can be written, and a second removal storage location from which each transmit command can be read out. Insert and removal locations of FIFO storage unit 26 would also be indicated by the pointers of the addressing system, as discussed above. The second insert storage location is advanced by the processor writing a transmit command into FIFO storage unit 26. The second removal storage location is advanced by the medium access control unit reading a transmit command from FIFO storage unit 26. Constructed as such, a transmit command uniquely associated with a data packet in a specific page location of memory buffer 18, can be written into the insert storage location of FIFO storage unit 2 by the processo·. Also transmit command stored in the removal storage location can be selectively read out therefrom by medium access control unit 17.

With the command buffering means organized as described above, FIFO storage unit 25 is capable of queuing (i.e. sequentially chaining together) receive commands and thus functions as a receive command queue, whereas FIFO storage unit 26 is capable of queuing transmit commands and thus functions as a transmit command queue. Also, since data packet memory buffer 18 is readily structurable into receive and transmit data packet queues, it is possible for medium access control unit 17 to consecutively execute transmit and receive commands (once loaded into FIFO storage units 25 and 26, respectively) in a manner completely independent of the host processor.

As illustrated in FIG. 5, status buffering unit 22 is realized by third and fourth FIFO storage units 27 and 28, for temporary storage of receive and transmit status bits, respectively. As will be described in greater detail hereinafter, third and fourth FIFO storage units function as receive and transmit status bit queues, respectively. Each FIFO storage unit 27 and 28 has a plurality of status bit storage locations which, in the illustrated embodiment, is of depth 2. As in the case of the command buffer unit, the depth of FIFO storage units 27 and 28 can also be expanded to a depth greater than two; however, what is minimally required for the successful practice of the invention is that the depth of the receive command and receive status FIFO storage units be equal, as should be the depth of the transmit command and transmit status FIFO storage units. In the illustrated embodiments, the length of each status bit storage location in FIFO storage unit 27 is of bit length 1, whereas the length of FIFO storage unit 28 is of bit length 2. Again, in other embodiments, the length of these storage locations may change.

As shown, command bit lines 30 and 31 extend from the output of command format conversion units 32 and 33, respectively, and lead into medium access control unit 17. The outputs of FIFO storage units 25 and 26 are connected to the inputs of format conversion units 32 and 33, respectively. The function of these units is to convert receive and transmit commands into receive and transmit command bits. These format conversion units can be realized by using decoder technology known in the art. Line 34 from medium access unit 17 provides status bit RI to the read input of FIFO storage unit 25, and status bit TRI to the data input of FIFO storage unit 27. Also, line 35 from medium access control unit 17 provides status bit TA to the read input of second FIFO storage unit 26, and status bit TTA to the first data input of fourth FIFO storage unit 28. On the other hand, line 36 from unit 17 provides status bit TMA to the second input of FIFO storage unit 28.

Write signals are provided to FIFO storage units 27 and 28 over write lines 37 and 38 emanating from the medium access control unit. Line 39 extends from command routing unit 23 to each read/clear input of FIFO storage units 27 and 28 so that clear receive (status) and clear transmit (status) commands can be provided from the processor to these FIFO storage units so as to advance respective removal storage locations therewithin. A line 40 is also provided between medium access control unit 17 and status bit combining unit 24 for providing the status bit combining unit with miscellaneous status bits, well known in the art.

Figure 8:
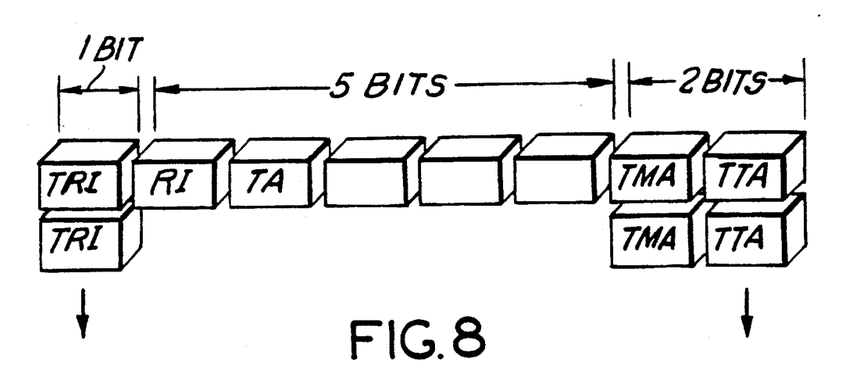
FIG. 8 is a schematic representation of the status bits provided by the command and status interface unit of the illustrated embodiment to the bus interface unit, for selected reading by the station processor.

The status bits read out of FIFO storage units 27 and 28 are sent over lines 41 and 42 to status bit combining unit 24, within which receive and transmit status bits from FIFO storage units 27 and 28 and miscellaneous status bits from medium access control unit 17, are combined. The sequence of combined status bits are, in turn, provided to bus interface unit 15 over line 43, as shown. The format of the sequence of combined status bits is illustrated in FIG. 8.

The plurality of receive status bit storage locations of third FIFO storage unit 27 include a third insert storage location into which each set of receive status bits can be written, and also, a third removal storage location from which each set of receive status bits can be read out. In general, the set of receive status bits can contain one or more elements, and in certain events, even the null element. Also, in practice, the insert and removal locations would be indicated by the pointers of the addressing system used in implementing FIFO storage device 27. The third insert storage location is advanced by the medium access control unit writing a set of receive status bits into third FIFO storage unit 27. On the other hand, the third removal storage location is advanced by the processor issuing a clear receive command to third FIFO storage unit 27. Constructed as such, a set of receive status bits uniquely associated with a received data packet in a specific page of memory buffer 18 can be written into the insert storage location of third FIFO storage unit 27 by the medium access control unit. Also, the set of receive status bits in the third removal storage location can be selectively read out therefrom and combined with the other status bits in combiner unit 24, thereby updating the status bit sequence provided to the processor when it is so solicited. Also, whenever a clear receive command is issued to third FIFO storage unit 27, the current status bit(s) in the removal storage location are cleared, and the next set of receive status bits from the medium access control unit 17 can be read into the third insert storage location.

Similarly, the plurality of transmit status bits storage locations of fourth FIFO storage unit 28 include a fourth insert storage location into which each set of transmit status bits can be written, and a fourth removal storage location from which each set of transmit status bits can be read out. In general, the set of transmit status bits can contain one or more elements, and in certain events, even the null element. Also, as with the other FIFO storage units, the insert and removal locations would also be indicated by the pointers of the addressing system used in implementing FIFO storage device 28. The fourth insert storage location is advanced by the medium access control unit writing a set of transmit status bits into fourth FIFO storage unit 28. On the other hand, the fourth removal storage location is advanced by the processor issuing a clear transmit command to fourth FIFO storage unit 28. Constructed as such, a set of transmit status bits uniquely associated with a to-be-transmitted data packet in a specific page of memory buffer 18 can be written into the insert storage location of fourth FIFO storage unit by the medium access control unit 17. Also, the set of transmit status bits in the fourth removal storage location can be selectively read out therefrom and combined with the other status bits in combiner unit 24, thereby updating the status bit sequence provided to the processor when so solicited. Also, whenever a clear transmit command is issued to fourth FIFO storage unit 28, the current status bit(s) in the removal storage location are cleared, and the next set of transmit status bits from the medium access control unit 17 can be read into the fourth insert location.

With the above-described command and status interface unit, the sequence of combined status bits can be read by the processor when required, without necessarily clearing certain receive and/or transmit status bits through a designated status bit clearing operation, until desired by the processor.

Having described the structure and function of the command and status interface unit 16 of the present invention and its cooperation with the other functional units of communication controller 7', attention is now given to the events which trigger a number of significant operations within the command and status interface unit.

During the course of a station's operation within the local area network, a number of events can occur at the host processor, as well as within the medium access control unit. Of the possible events which can occur at the processor, there are four, in particular, which have been selected to trigger four particular operations within the command and status interface unit. These four processor events shall be designated by events $E_{P1}$, $E_{P2}$, $E_{P3}$, and $E_{P4}$. Similarly, of the possible events which can occur within the medium access control unit during network protocol, there are four, in particular, which also have been selected to trigger an additional four operations within the command and status interface unit. These four events which occur within the medium access control unit shall be designated by events $E_{M1}$, $E_{M2}$, $E_{M3}$ and $E_{M4}$. The above-identified events are now described below.

In the illustrated embodiment, first FIFO storage unit 25 permits the processor to write a receive command into the first FIFO storage unit whenever event $E_{P1}$ occurs. This event occurs whenever the processor places a receive command on the system bus. Prior to event $E_{P1}$, however, the processor must first select a page location in memory buffer 18 for the data packet to be received, and this page location must be uniquely assigned to (or associated with) a particular receive command containing the received page location. Thus, after a page of memory has been selected in memory buffer 18 and a received command has been formulated, the processor is free to write the receive command into the first FIFO storage unit as and when it pleases.

The medium access control unit is permitted to read a received command out of the first FIFO storage unit and into unit 17 itself, whenever event $E_{M1}$ occurs. This event occurs whenever the medium access control unit is ready, in the time sense, to accept a receive command for execution.

Similarly, second FIFO storage unit permits the processor to write a transmit command into second FIFO storage unit whenever event $E_{P2}$ occurs. This event occurs whenever the processor places a transmit command on the system bus. However, as is the case of data reception, the processor must select a page location in memory buffer 18, into which the data packet to be transmitted must be stored, and this memory location must be uniquely assigned to (or associated with) a particular transmit command. Thus, after a data packet has been stored in a page location of buffer memory 18 which is uniquely assigned to a formulated transmit command, the processor is free to write the transmit command into the second storage unit as and when it pleases.

The medium access control unit is permitted to read a transmit command out of second FIFO storage unit and into unit 17 itself, whenever event $E_{M2}$ occurs. This event occurs whenever the medium access control unit is ready, in the time sense, to accept a transmit command for execution.

The medium access control unit can write a set of receive status bits into the third insert storage location of third FIFO storage unit 27. The third insert storage location of third FIFO storage unit 27 is advanced whenever event $E_{M3}$ occurs. This event occurs each time the medium access control unit writes receive status bits into the third FIFO storage unit. As the communication controller 7' is configured in the illustrated embodiment, receive status bits in the third removal storage location are always being combined in status bit combining unit 24 and being presented to the system bus interface unit for inspection at any time by the processor. The receive status bits in the third removal storage location are advanced each time event $E_{P3}$ occurs at the processor. This event is when the processor issues a clear receive command to the command and status interface unit. When this occurs, the receive status bits in the third removal storage location are cleared (i.e. irretrievably erased), and the next receive status bit(s) in the chain of receive status bits are advanced to the current removal storage location in third FIFO storage unit 27.

Similarly, the medium access control unit can write a set of transmit status bits into the fourth insert storage location of fourth FIFO storage unit 28. The fourth insert storage location of fourth FIFO storage unit 28 will be advanced whenever event $E_{M4}$ occurs. This event occurs each time the medium access control unit writes transmit status bits into the fourth FIFO storage unit. As the communication controller 7' is configured in the illustrated embodiment, transmit status bits in the fourth removal storage location of FIFO storage unit 28 are always being combined in bit combiner unit 24 and being presented to the system bus interface unit for inspection at any time by the processor. The transmit status bits in the fourth removal storage register of FIFO storage unit are advanced each time event $E_{P4}$ occurs at the processor. This event occurs when the processor issues a clear transmit command to the command and status interface unit. When this occurs, the transmit status bits in the fourth removal storage location is cleared or irretrievably erased, and the next transmit status bit(s) in the chain of transmit status bits is to the current removal storage register in fourth FIFO storage unit 28.

Having described the communication controller of the present invention and its various capabilities, a brief description of its operation in accordance with Arcnet ® network protocol is in order.

Communication on the network is based on a token passing protocol. Establishment of the network configuration and management of the network protocol are handled entirely by the medium access control unit in a manner well-known in the art. In general, the host processor (or other intelligent peripheral) transmits data by simply loading a data packet and its destination ID into memory buffer 18, and issuing a transmit command to command and status and control unit 16, to enable the medium access control unit. If the receiving station responds by transmitting an ACK packet, then the data packet is transmitted followed by 16 bits of CRC code. If the receiving station cannot accept the data packet (e.g. because its receiver is inhibited), then it transmits a NAK packet and the transmitting station then passes the token. Once it has been established that the receiving station can accept the packet and transmission is complete, the receiving station will verify the packet. If the packet is received successfully, the receiving station transmits a ACK packet allowing the transmitting station to set the appropriate status bits to indicate successful or unsuccessful delivery of the packet. The sequence of status bits provided to interrupt generating subunit 19 is then used to generate an interrupt to the processor when selected status bits become true.

Figure 9:
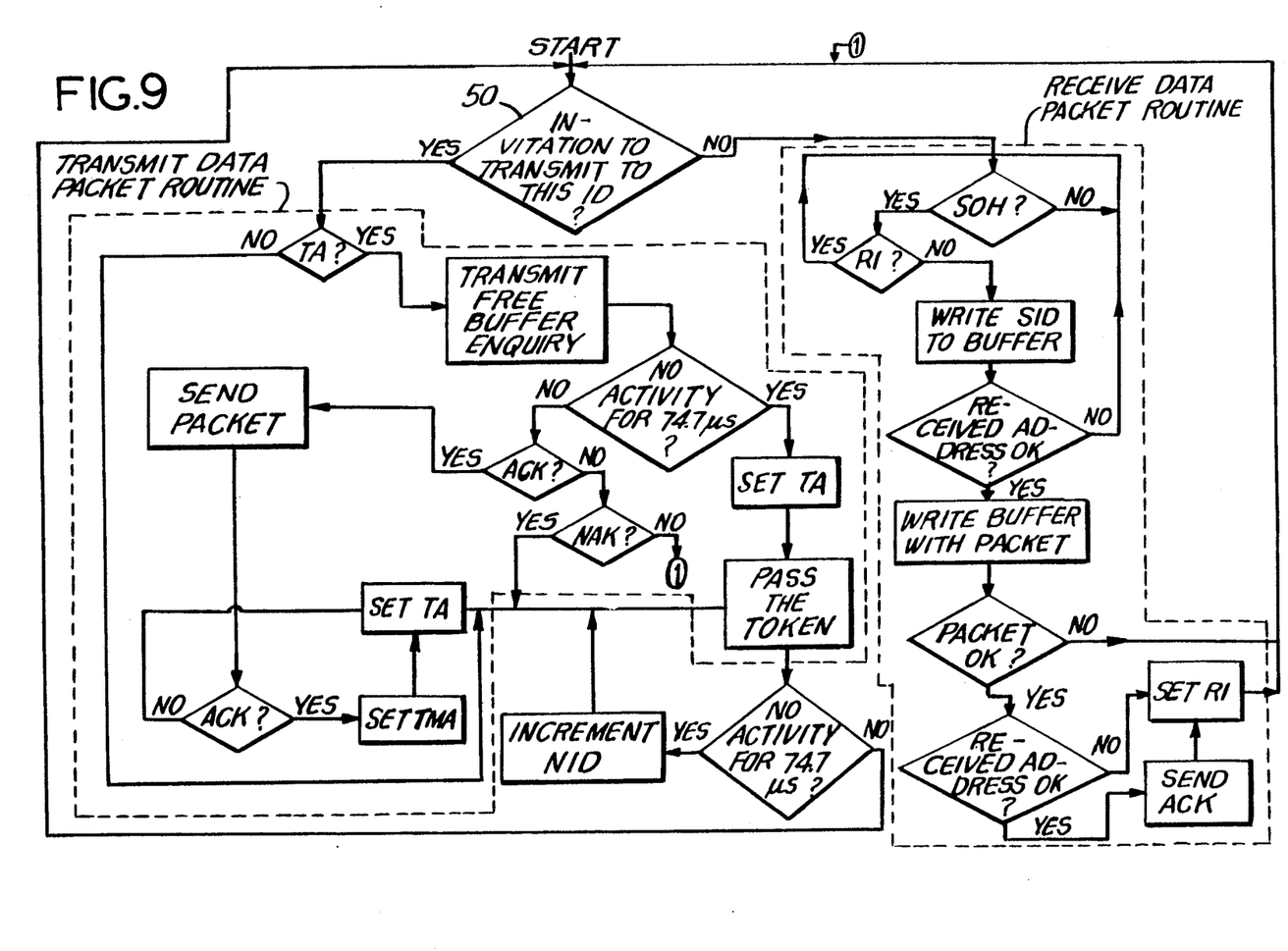
FIG. 9 is a flow control diagram illustrating the sequence of events occurring within the medium access control unit of the communication controller of the illustrated embodiment, during data packet transmission and reception operations.

Turning now to the flow chart of FIG. 9, the internal operations of communication controller 7' are described during both transmission and reception modes of operation.

As illustrated in FIG. 9, the various checks or conditions to be verified by the medium access control unit are expressed from a particular station's frame of reference. Thus, starting at block 50 the medium access control unit determines whether it holds the "token" by determining whether it has received an ITT packet. If the medium access control unit has received an ITT packet, then it enters the Transmit Data Packet Routine, as shown. If the medium access control unit has not received an ITT packet, then it enters the Receive Data Packet Routine. The Transmit Data Packet Routine will be described first.

Upon receiving an ITT packet, the medium access control unit determines if status bit TA is a no value (i.e. logic "0"), indicative of the fact that the medium access control unit is available to transmit a data packet. If status bit TA is a no value, then medium access control unit transmits a FBE packet to the intended receiving station. If no input activity is detected from the receiving station within a predetermined time period (e.g. 74.7 microseconds) then the medium access control unit determines whether an ACK packet has been received. If it has, then the transmitting station sends the data packet.

On the other hand, if the transmitting station receives an ACK packet, then status bits TMA and TA are both set to logic "1". Thereafter, an ITT packet with the next station ID code is transmitted to pass the token. If no input activity is detected within a predetermined period (e.g. 74.7 microseconds), then the medium access control unit will return to start, at which block 50 is entered. If n input activity is detected from the station to whom the token was sent, then the station will increment the ID code of the ITT packet and then send the token to the next station within the network configuration. As illustrated in FIG. 9, the transmitting station continues to send out the token until a station acts upon it. Most significantly, owing to the fact of command and status queueing, there is no need for the host processor to intervene during subsequent data transmission routines.

In the event that the medium access control unit was not available to transmit a data packet, as evidenced by the TA status bit having a "yes" value (i.e. logic "1"), the token passing loop is entered in order to enable the next eligible station in the network to transmit a data packet.

In the event that the reference station does not possess the token, then the medium access control unit enters the Receive Data Packet Routine, as shown at block 50 in FIG. 9. According to this routine, the medium access control unit continually senses the communication medium until it detects a data packet by the presence of SOH bits. If SOH bits are detected and if status bit RI has a "no" value indicative that the reference receiving station is not inhibited to receive a data packet, then the SID bits of the data packet are written into a reserved page within buffer memory 18, as specified in the current receive command.

Since the data packet can be intended solely for the reference receiving station, or for all stations in the network as during a "broadcast", the destination address of the data packet is checked against the receiving address. If the data packet to be received is intended either for all stations or the receiving station, then the medium access control unit writes the received data packet into the reserved page of buffer memory 18, and thereafter checks the integrity of the reception through an error detection technique. Then, the destination address of the data packet is checked against the address of the receiving station.

If the received data packet was intended for only a single receiving station, then the ACK packet is sent by the receiving station to the transmitting station to acknowledge safe arrival of the data packet. Thereafter, the RI status bit is set to the "yes" value (i.e. logic "1") and then the medium access control unit returns to the start state, as shown. If, on the other hand, the data packet was broadcasted to all stations, then the medium access control unit does not send an ACK packet to the transmitting station, and simply sets status bit RI and returns to the start state of operation. If the same transmitting station desires to consecutively receive a number of data packets, the communication controller of the receiving station need simply execute the Receive Data Packet Routine in a repeated manner when permitted by the network protocol. In such a case, host processor intervention is not immediately required.

In the illustrated embodiment of the present invention, the storage units of the command and status buffering means were realized using FIFO storage units. Notably, however, other types of storage devices, such as for example, Last-In-Last-Out (LILO) storage devices, can be used with expectedly good results with suitable modifications.

While the particular embodiments shown and described above have proven to be useful in many applications in the data communication art, further modifications of the present invention herein disclosed will occur to persons skilled in the art to which the present invention pertains, and all such modifications are deemed to be within the scope and spirit of the present invention defined by the appended claims.

What is claimed is:

1. A command and status interface unit for use in a communication controller operably associated with data packet buffer memory having a plurality of data packet storage locations, said command and status interface unit comprising:
   command buffering means having
   a plurality of receive command storage locations, into which one or more receive commands can be written by a processor and selectively read out therefrom by a medium access control unit, each said receive command being uniquely associated with one said data packet storage location, and
   a plurality of transmit command storage locations, into which one or more transmit commands can be written in by said processor and selectively read out therefrom by said medium access control unit, each said transmit command being uniquely associated with one said data packet storage location; and
   status buffering means having
   a plurality of receive status storage locations, into which a set of receive status bits can be written by said medium access control unit and selectively read out therefrom by said processor, and
   a plurality of transmit status storage locations, into which a set of transmit status bits can be written in by said medium access control unit and selectively read out therefrom by said processor.
   said command buffering means and said status buffering means each being operably associatable with said processor and said medium access control unit so as to allow consecutive transmission and reception of said data packets in a manner independent of the operation of said processor.

2. The command and status interface unit of claim 1, wherein said command buffering means comprises a first storage unit and a second storage unit, wherein said first storage unit contains said plurality of receive command storage locations, and said second storage unit contains said plurality of transmit command storage locations, and wherein said status buffering means comprises a third storage unit and a fourth storage unit, wherein said third storage unit contains said plurality of receive status storage locations, and said fourth storage unit contains said plurality of transmit status storage locations.

3. The command and status interface unit of claim 2, wherein said first storage unit permits said processor to write one said receive command from said processor into said first storage unit upon the occurrence of a first prespecified processor event, and further permitting said medium access control unit to read one said receive command out of said first storage unit and into said medium access control unit upon the occurrence of a first prespecified event within said medium access control unit, and wherein said second storage unit permits said processor to write one said transmit command from said processor into said second storage unit upon the occurrence of a second prespecified processor event, and further permitting said medium access control unit to read one said transmit command from said second storage unit into said medium access storage unit upon the occurrence of a second prespecified event within said medium access control unit.

4. The command and status interface unit of claim 3, wherein said third storage unit permits said medium access control unit to write one said set of receive status bits from said medium access control unit into said third storage unit, and further permitting said processor to read out one said set of receive status bits from said third storage unit and transfer said set of receive status bits to a system bus interface unit, for transfer to said system bus and for selected processing to generate interrupts to said processor, and wherein said fourth storage unit permits said medium access control unit to write one said set of transmit status bits from said medium access control unit into said fourth storage unit, and further permitting said processor to read out one said set of transmit status bits from said fourth storage unit and transfer said set of transmit status bits to said system bus interface unit, for transfer to a system bus and for selected processing to generate interrupts to said processor.

5. The command and status interface unit of claim 4, wherein said first storage unit comprises a first FIFO storage unit, said second storage unit comprises a second FIFO storage unit, said third storage unit comprises a third FIFO storage unit, said fourth storage unit comprises a fourth FIFO storage unit.

6. The command and status interface unit of claim 5, which further comprises command routing means for selectively routing said receive commands to said first FIFO storage unit, and for selectively routing said transmit commands to said second FIFO storage unit.

7. The command and status interface unit of claim 6, wherein said command routing means further comprises status clearing means for generating status clearing signals which are provided to said third and fourth FIFO storage units, and further includes means for routing miscellaneous commands to said medium access control unit.

8. The command and status interface unit of claim 7, which further comprises
receive command conversion means for converting the format of each said receive command read out from said first FIFO storage unit and producing a converted receive command which is provided to said medium access control unit, and
transmit command conversion means for converting the format of each said transmit command read out from said second FIFO storage unit and producing a converted transmit command which is provided to said medium access control unit.

9. The command and status interface unit of claim 5, wherein said first prespecified processor event is defined as when said processor writes one said receive command into said first FIFO storage unit, and said first prespecified event in said medium access control unit is defined as when said medium access control unit is ready to accept one said receive command.

10. The command and status interface unit of claim 9, wherein said second prespecified processor event is defined as when said processor writes one said transmit command into said second FIFO storage unit, and said second prespecified event in said medium access control unit is defined as when said medium access control unit is ready to accept one said transmit command.

11. The command and status interface unit of claim 10, wherein said third storage unit permits said medium access control unit to write one said set of receive status bits into said FIFO storage unit only after said medium access control unit completes execution of one said receive command.

12. The command and status interface unit of claim 11, wherein said second storage unit permits said medium access control unit to write one said set of transmit status bits into said fourth FIFO storage unit only after said medium access control unit completes execution of one said transmit command.

13. The command and status interface unit of claim 12, wherein said system bus interface unit further comprises interrupt generating means for selected processing of said set of receive status bits read out of said third FIFO storage unit and said set of transmit status bits read out of said fourth FIFO storage unit, so as to generate interrupts to said processor.

14. The command and status interface unit of claim 5, wherein said plurality of receive command storage locations of said first FIFO storage unit comprises
a first insert storage location into which each said receive command can be written, and
a first removal storage location from which each said receive command can be read out,
said first insert storage location being advanced by said processor writing into said first FIFO storage unit and said first removal storage location being advanced by said medium access control unit reading from said first FIFO storage unit.

15. The command and status interface unit of claim 14, wherein said plurality of transmit command storage locations of said second FIFO storage unit comprises
a second insert storage location into which each said transmit command can be written, and
a second removal storage location from which each said transmit command can be read out,
said second insert storage location being advanced by said processor writing into said second FIFO storage unit and said second removal storage location being advanced by said medium access control unit reading from said second FIFO storage unit.

16. The command and status interface unit of claim 15, wherein said plurality of receive storage locations of status FIFO storage unit comprises
a third insert storage location into which each said set of receive status bits can be written, and
a third removal storage location from which each said set of receive status bits can be read out,
said third insert storage location being advanced upon the occurrence of a third prespecified event within said medium access control unit, and said third removal storage location being advanced upon the occurrence of a third prespecified processor event.

17. The command and status interface unit of claim 16, wherein said third prespecified event within said medium access control unit is defined as when said medium access control unit writes into said third FIFO storage unit, and wherein said third prespecified processor event is defined as when said processor issues a clear receive command to said third FIFO storage unit.

18. The command and status interface unit of claim 17, wherein said plurality of transmit status storage locations of said fourth FIFO storage unit comprises
a fourth insert storage location into which each said set of transmit status bits can be written; and
a fourth removal storage location from which each said set of transmit status bits can be read out,
said fourth insert storage location being advanced upon the occurrence of a fourth prespecified event within said medium access control unit, and said fourth removal storage location being advanced upon the occurrence of a fourth prespecified event within said medium access control unit.

19. The command and status interface unit of claim 18, wherein said fourth prespecified event within said medium access control unit is defined as when medium access control unit writes into said fourth FIFO storage unit, and wherein said fourth prespecified processor event is defined as when said processor issues a clear transmit command to said fourth FIFO storage unit.

20. A method of buffering receive and transmit commands and status bits within a command and status interface unit of a communication controller having a medium access control unit and being in operable association with a processor, said method comprising the steps of:
(a) maintaining in said command and status interface unit, a receive command queue having a plurality of receive command storage locations, said receive command queue having a first insert storage location at which each receive command can be inserted into said receive command queue, and a first removal storage location from which each receive command can be removed from said receive command queue, each said receive command storage location being capable of storing one said receive command;
(b) maintaining in said command and status interface unit, a transmit command queue having a second plurality of transmit command storage locations, said transmit command queue having a second insert storage location at which each transmit command can be inserted in said transmit command queue, and a second removal storage location from which each transmit command can be removed from said transmit command queue, each said transmit command storage location being capable of storing one said transmit command;
(c) providing a first plurality of receive data packet storage locations for storing at least a first plurality of data packets to be received, each said receive data packet storage location being uniquely associated with one said receive command being stored in said receive command queue;
(d) providing a second plurality of transmit data packet storage locations for storing a second plurality of data packets to be transmitted, each said transmit data packet storage location being uniquely associated with one said transmit command being stored in said transmit command queue;
(e) maintaining in said command and status interface unit, a receive status queue having a plurality of receive status bit storage locations, said receive status queue having a third insert storage location at which each set of receive status bits can be inserted into said receive status queue, and a third removal storage location from which each said set of receive status bits can be removed from said receive status queue, wherein each said receive status bit storage location is uniquely associated with one said receive command; and
(f) maintaining in said command and status interface unit, a transmit status queue having a plurality of transmit status bit storage locations, said transit status queue having a fourth insert storage location at which each set of transmit status bits can be inserted into said transmit status queue, and a fourth removal storage location at which each said set of transmit status bits can be removed from said transmit status queue, wherein each said transmit status bit is uniquely associated with one said transmit command.

21. The method of claim 20, which further comprises advancing said first insert storage location of said receive command queue by said processor writing a receive command into said receive command queue, and
advancing said first removal storage location of said receive command queue by said medium access control unit reading a receive command from said receive command queue.

22. The method of claim 21, which further comprises advancing said second insert storage location of said transit command queue by said processor writing a transmit command into said transmit command queue, and
advancing said second removal storage location of said transit command queue by said medium access control unit reading a transmit command from said transmit command queue.

23. The method of claim 23, which further comprises advancing said third insert storage location of said receive status queue by said medium access control unit writing a set of receive status bits into said receive status queue, and
advancing said third removal storage location of said receive status queue by said processor issuing a clear receive command to said receive status queue.

24. The method of claim 23, which further comprises advancing said fourth insert storage location of said transit status queue by said medium access control unit writing a set of transmit status bits into said transmit status queue, and
advancing said fourth removal storage location of said transit status queue by issuing a clear transmit command to said transmit status queue.

25. The method of claim 20, wherein step (c) further comprises selecting one said receive data packet storage location for storage of a data packet to be received and uniquely associating said selected receive data packet storage location with a receive command, and wherein step (a) further comprises said processor writing said uniquely associated receive command into said first insert storage location of said receive command queue, and said medium access control unit reading a receive command from said first removal storage location when said medium access control unit is free to accept said read receive command for execution.

26. The method of claim 25, wherein step (d) further comprises selecting one said transmit data packet storage location for storage of a data packet to be transmitted and uniquely associating said selected transmit data packet storage location with a transmit command, and wherein step (b) further comprises said processor writing said uniquely associated transmit command into said second insert storage location, and said medium access control unit reading a transmit command from said second removal storage location when said medium access control unit is ready to accept said transmit command for execution.

27. The method of claim 26, wherein step (e) further comprises said medium access control unit writing a set of receive status bits into said third insert storage location, and said receive status queue presenting to said processor for inspection, the set of receive status bits in said third removal storage location.

28. The method of claim 27, wherein step (f) further comprises said medium access control unit writing a set of transmit status bits into said fourth insert storage location, and said transmit status queue presenting to said processor for inspection, the set of transmit status bits in said fourth removal storage location.

29. A data communication controller operably associated with a data packet buffer means having a plurality of data packet storage locations, and a processor having a system bus and desiring access to a communication medium within a local-area network, said data communication controller comprising:
- a medium access control unit for controlling the access of said data communication controller to said communication medium;
- a command and status interface unit including command buffering means and status buffering means, said command buffering means having a plurality of receive command storage locations, into which one or more receive commands can be written by a processor and selectively read out therefrom by a medium access control unit, each said receive command being uniquely associated with one said data storage packet location, and
- a plurality of transmit command storage locations, into which one or more transmit commands can be written in by said processor and selectively read out therefrom by said medium access control unit, each said transmit command being uniquely associated with one said data packet storage location, and
said status buffering means having a plurality of receive status storage locations, into which a set of receive status bits can be written by said medium access control unit and selectively read out therefrom by said processor, and
- a plurality of transmit status storage locations, into which a set of transmit status bits can be written in by said medium access control unit and selectively read out therefrom by said processor, said command buffering means and said status buffering means each being operably associatable with said processor and said medium access control unit so as to allow consecutive transmission and reception of said data packets in a manner independent of the operation of said processor; and
- a system bus interface unit for interfacing said command and status interface unit with the system bus of said processor.

30. The data communication controller of claim 29, wherein said command buffering means comprises a first storage unit and a second storage unit, wherein said first storage unit contains said plurality of receive command storage locations, and said second storage unit contains said plurality of transmit command storage locations, and wherein said status buffering means comprises a third storage unit and a fourth storage unit wherein said third storage unit contains said plurality of receive status storage locations, and said fourth storage unit contains said plurality of transmit status storage locations.

31. The data communication controller of claim 30, wherein said first storage unit permits said processor to write one said receive command from said processor into said first storage unit upon the occurrence of a first prespecified processor event, and further permitting said medium access control unit to read one said receive command out of said first storage unit and into said medium access control unit upon the occurrence of a first prespecified event within said medium access control unit, and wherein said second storage unit permits said processor to write one said transmit command from said processor into said second storage unit upon the occurrence of a second prespecified processor event, and further permitting said medium access control unit to read one said transmit command from said second storage unit into said medium access storage unit upon the occurrence of a second prespecified event within said medium access control unit.

32. The data communication controller of claim 31, wherein said third storage unit permits said medium access control unit to write one said set of receive status bits from said medium access control unit into said third storage unit, and further permitting said processor to read out one said set of receive status bits from said third storage unit and transfer said set of receive status bits to a system bus interface unit, for transfer to said system bus and for selected processing to generate interrupts to said processor, and wherein said fourth storage unit permits said medium access control unit to write one said set of transmit status bits from said medium access control unit into said fourth storage unit, and further permitting said processor to read out one said set of transmit status bits from said fourth storage unit and transfer said set of transmit status bits to said system bus interface unit, for transfer to a system bus and for selected processing to generate interrupts to said processor.

33. The data communication controller of claim 32, wherein said first storage unit comprises a first FIFO storage unit, said second storage unit comprises a second FIFO storage unit, said third storage unit comprises a third FIFO storage unit, said fourth storage unit comprises a fourth FIFO storage unit.

34. The data communication controller of claim 33, which further comprises command routing means for selectively routing said receive commands to said first FIFO storage unit, and for selectively routing said transmit commands to said second FIFO storage unit.

35. The data communication controller of claim 34, wherein said command routing means further comprises status clearing means for generating status clearing signals which are provided to said third and fourth FIFO storage units, and further includes means for routing miscellaneous commands to said medium access control unit.

36. The data communication controller of claim 35. which further comprises
receive command conversion means for converting the format of each said receive command read out from said first FIFO storage unit and producing a converted receive command which is provided to said medium access control unit, and
transmit command conversion means for converting the format of each said transmit command read out from said second FIFO storage unit and producing a converted transmit command which is provided to said medium access control unit.

37. The data communication controller of claim 33, wherein said first prespecified processor event is defined as when said processor writes one said receive command into said first FIFO storage unit, and said first prespecified event in said medium access control unit is defined as when said medium access control unit is ready to accept one said receive command.

38. The data communication controller of claim 37, wherein said second prespecified processor event is defined as when said processor writes one said transmit command into said second FIFO storage unit, and said second prespecified event in said medium access control unit is defined as when said medium access control unit is ready to accept one said transmit command.

39. The data communication controller of claim 38, wherein said third storage unit permits said medium access control unit to write one said set of receive status bits into said FIFO storage unit only after said medium access control unit completes execution of one said receive command.

40. The data communication controller of claim 39, wherein said second storage unit permits said medium access control unit to write one said set of transmit status bits into said fourth FIFO storage unit only after said medium access control unit completes execution of one said transmit command.

41. The data communication processor of claim 33, wherein said system bus interface unit further comprises interrupt generating means for selected processing of said set of receive status bits read out of said third FIFO storage unit and said set of transmit status bits read out of said fourth FIFO storage unit, so as to generate interrupts to said processor.

42. The data communication controller of claim 42, wherein said plurality of receive command storage locations of said first FIFO storage unit comprises
a first insert storage location into which each said receive command can be written, and
a first removal storage location from which each said receive command can be read out,
said first insert storage location being advanced by said processor writing into said first FIFO storage unit and said first removal storage location being advanced by said medium access control unit reading from said first FIFO storage unit.

43. The data communication controller of claim 42, wherein said plurality of transmit command storage locations of said second FIFO storage unit comprises
a second insert storage location into which each said transmit command can be written, and
a second removal storage location from which each said transmit command can be read out,
said second insert storage location being advanced by said processor writing into said second FIFO storage unit and said second removal storage location being advanced by said medium access control unit reading from said second FIFO storage unit.

44. The data communication controller of of claim 43, wherein said plurality of receive storage locations of status FIFO storage unit comprises
a third insert storage location into which each said set of receive status bits can be written, and
a third removal storage location from which each said set of receive status bits can be read out,
said third insert storage location being advanced upon the occurrence of a third prespecified event within said medium access control unit, and said third removal storage location being advanced upon the occurrence of a third prespecified processor event.

45. The data communication controller of claim 44, wherein said third prespecified event within said medium access control unit is defined as when said medium access control unit writes into said third FIFO storage unit, and wherein said third prespecified processor event is defined as when said processor issues a clear receive command to said third FIFO storage unit.

46. The data communication controller of claim 45, wherein said plurality of transmit status storage locations of said fourth FIFO storage unit comprises
a fourth insert storage location into which each said set of transmit status bits can be written; and
a fourth removal storage location from which each said set of transmit status bits can be read out,
said fourth insert storage location being advanced upon the occurrence of a fourth prespecified event within said medium access control unit, and said fourth removal storage location being advanced upon the occurrence of a fourth prespecified event within said medium access control unit.

47. The data communication controller of claim 46, wherein said fourth prespecified event within said medium access control unit is defined as when said medium access control unit writes into said fourth FIFO storage unit, and wherein said fourth prespecified processor event is defined as when said processor issues a clear transmit command to said fourth FIFO storage unit.

* * * * *